United States Patent [19]

Obayashi et al.

[11] Patent Number: 5,807,914
[45] Date of Patent: Sep. 15, 1998

[54] GLASS FIBER-REINFORCED POLYCARBONATE RESIN COMPOSITION

[75] Inventors: Naoto Obayashi; Tooru Watanabe; Hiroyoshi Maruyama, all of Hiratsuka, Japan

[73] Assignee: Mitsubishi Engineering-Plastics Corporation, Japan

[21] Appl. No.: 824,981

[22] Filed: Mar. 27, 1997

Related U.S. Application Data

[63] Continuation-in-part of Ser. No. 672,992, Jul. 1, 1996, abandoned.

[30] Foreign Application Priority Data

Jul. 5, 1995 [JP] Japan .................................... 7-169589

[51] Int. Cl.$^6$ ...................................................... C08J 5/24
[52] U.S. Cl. ...................... 524/267; 428/34.4; 428/35.7; 428/36.3; 428/36.9; 524/265; 524/442; 528/196; 528/198
[58] Field of Search .................................... 524/267, 265, 524/442; 428/34.4, 35.7, 36.3, 36.9; 528/196, 198

[56] References Cited

U.S. PATENT DOCUMENTS 4,888,388 12/1989 Hongo et al. .............................. 525/67

FOREIGN PATENT DOCUMENTS 3-160052  7/1991  Japan .
4-345657  12/1992  Japan .

Primary Examiner—Terressa Mosley
Attorney, Agent, or Firm—Parkhurst & Wendel, L.L.P

[57] ABSTRACT

The present invention relates to a glass fiber-reinforced polycarbonate resin composition comprising:

(A) 70 to 92% by weight of an aromatic polycarbonate resin;

(B) 1 to 20% by weight of an aromatic polycarbonate oligomer;

(C) 3 to 20% by weight of a glass fiber comprising a short glass fiber having a fiber length of not more than 140 $\mu$m and a long glass fiber having a fiber length of more than 140 $\mu$m; and (D) 0.5 to 15% by weight of a composite rubber-based graft copolymer, halogen content in said resin composition being not more than 0.5% by weight based on total weight of said resin composition.

14 Claims, No Drawings

GLASS FIBER-REINFORCED POLYCARBONATE RESIN COMPOSITION

CROSS REFERENCE TO RELATED APPLICATION

This is a continuation-in-part of application Ser. No. 08/672,992, filed Jul. 1, 1996, now abandoned.

BACKGROUND OF THE INVENTION

The present invention relates to a glass fiber-reinforced polycarbonate resin composition. More particularly, the present invention relates to a glass fiber-reinforced aromatic polycarbonate resin composition capable of not only exhibiting a good moldability when molded into a thin molded product but also providing the thin molded product having excellent appearance property, rigidity and impact resistance.

Aromatic polycarbonate resins have been widely utilized because the resins are excellent for mechanical strength, impact resistance, heat resistance and dimensional stability. However, such aromatic polycarbonate resins exhibit a low flowability upon molding. Consequently, in the case where the aromatic polycarbonate resins are applied to a thin molded product, e.g., housings or covers for portable terminal equipment, there occur disadvantages in appearance property or the like. It is required for the thin molded material having an excellent appearance property to increase a mechanical strength and a rigidity.

It is known that a glass fiber is incorporated in the resin for an increase of rigidity of the molded material comprising aromatic polycarbonate resin. However, by this means, there occurs disadvantages that not only the flowability of the resin is further lowered but also the appearance property of molded product deteriorates considerably. On the other hand, it is also known that an aromatic polycarbonate resin having a relatively lower molecular weight or a lubricant is incorporated in the aromatic polycarbonate resin for improving the flowability of the resin material. However, by these means, not only the appearance property of the molded product is not improved insufficiently but also the mechanical properties thereof deteriorates. Especially, in the case where the resin material is applied to the thin molded product such as the housings or the covers for portable terminal equipment, there occurs disadvantages that the thin molded product is considerably inferior in impact resistance which is an important property to prevent a damage thereto upon dropping.

Further, in order to improve the impact resistance of the molded product, it is known to use an impact modifier, typically an elastomer. However, in case where such an impact modifier is incorporated in the resin, a phase separation between the impact modifier and the aromatic polycarbonate resin is caused at near-gate portions or uneven thickness portions of the molded product upon injection-molding. Such a phase separation causes poor dispersion of the resin material, which results in a deteriorated appearance property such as generation of flow marks or silver surfaces. The use of such an impact modifier further causes problems that, when the resin is subjected to a high temperature molding process generally used, the resultant molded product suffers from a heat deterioration, which also results in insufficient impact resistance and deterioration of appearance property such as color shade due to yellow discoloration or silver surfaces.

In the production of a thin molded product such as especially the housings or the covers for portable terminal equipment, it is required that the thin molded product exhibits an excellent appearance property. In consequence, it is hitherto difficult to obtain a satisfactory glass fiber-reinforced aromatic polycarbonate resin which well-balancedly satisfy all the requirements to not only the mechanical strength, rigidity and impact resistance but also the flowability upon molding and appearance property.

Japanese Patent Application Laid-Open (KOKAI) No. 4-345657 discloses a flame-retardant thermoplastic polycarbonate resin composition comprising a halogenated aromatic polycarbonate resin, a non-halogenated aromatic polycarbonate resin, an aromatic polyester resin and a composite rubber-graft copolymer, and halogen content being 3 to 25% by weight based on total weight. However, the resin composition of JP KOKAI 4-345657 contains 3 to 25% of halogen for flame-retardation, and as a result it is insufficient in heat resistance so that the appearance property of the product molded at high temperature is deteriorated.

Japanese Patent Application Laid-Open (KOKAI) 3-160052 discloses a glass fiber-reinforced flame-retardant resin composition comprising aromatic polycarbonate resin, styrene-based resin and flame retardant and a resin composition comprising glass fibers. However, the resin composition of JP KOKAI 3-160052 is insufficient in flowability upon molding and impact resistance, and it is difficult to obtain the thin molded product having an excellent impact resistance.

As a result of the present inventors' earnest studies on the afore-mentioned problems for the glass fiber-reinforced polycarbonate resin, it has been found that when a thin molded product especially having a thickness of not less than 0.5 mm and less than 1.5 mm is produced with a resin composition with not more than 0.5% by weight of halogen content, prepared by blending an aromatic polycarbonate oligomer, a glass fiber and a composite rubber-based graft copolymer at particular mixing ratios to an aromatic polycarbonate resin at particular ratio, the thin molded product can exhibit excellent and well-balanced properties including not only an appearance property, mechanical properties and an impact resistance but also a flowability and a moldability upon molding. The present invention has been achieved on the basis of the findings.

SUMMARY OF THE INVENTION

It is an object of the present invention to provide a glass fiber-reinforced aromatic polycarbonate resin composition having an excellent heat stability and capable of providing a thin molded product which can exhibit excellent and well-balanced properties including an appearance property, mechanical properties and an impact resistance, and a flowability and a moldability upon molding.

To accomplish the aims, in an aspect of the present invention, there is provided a glass fiber-reinforced polycarbonate resin composition comprising:

(A) 70 to 92% by weight of an aromatic polycarbonate resin;

(B) 1 to 20% by weight of an aromatic polycarbonate oligomer;

(C) 3 to 20% by weight of a glass fiber comprising a short glass fiber having a fiber length of not more than 140 $\mu$m and a long glass fiber having a fiber length of more than 140 $\mu$m, a weight ratio of the short glass fiber to the long glass fiber being from 45:55 to 85:15 and the amount of a glass fiber component having a fiber length of more than 500 $\mu$m being 1 to 15% by weight based on the total weight of the glass fiber; and (D) 0.5 to 15% by weight of a composite rubber-based graft copolymer comprising a composite rubber comprising a polyorganosiloxane rubber component and a polyalkylacrylate rubber component or polyalkylmethacrylate rubber component, and graft component formed from an aromatic alkenyl compound and a vinyl cyanide compound, which graft component is grafted to the composite rubber, halogen content in the resin composition being not more than 0.5% by weight based on total weight of the said resin a composition.

DETAILED DESCRIPTION OF THE INVENTION

The present invention is described in detail below.

The aromatic polycarbonate resin (A) used in the present invention may be a thermoplastic polycarbonate prepared by reacting an aromatic dihydroxy compound or a mixture of the aromatic dihydroxy compound and a small amount of a polyhydroxy compound with phosgene or diester of carbonic acid. The thermoplastic polycarbonate may have a branched structure.

Examples of such aromatic dihydroxy compounds, may include 2,2-bis(4-hydroxyphenyl)propane (bisphenol A), 2,2-bis(4-hydroxy-3,5-dimethylphenyl)propane (tetramethyl-bisphenol A), 2,2-bis(4-hydroxy-3,5-dibromophenyl)propane (tetrabromo-bisphenol A), 2,2-bis(4-hydroxy-3,5-dichlorophenyl)propane (tetrachloro-bisphenol A), 1,1-bis(4-hydroxyphenyl)cyclohexane, bis(4-hydroxyphenyl)-p-diisopropyl-benzene, hydroquinone, resorcinol, 4,4-dihydroxy-diphenyl, or the like. Among them, non-halogenated aromatic dihydroxy compounds such as bisphenol A, tetramethyl-bisphenol A, 1,1-bis(4-hydroxyphenyl)cyclohexane, bis(4-hydroxyphenyl)-p-diisopropyl-benzene, hydroquinone, resorcinol, 4,4-dihydroxy-diphenyl are preferable and bisphenol A is especially preferable.

The branched aromatic polycarbonate can be obtained by substituting a polyhydroxy compound for a part, for example, 0.1 to 2 mol %, of the afore-mentioned dihydroxy compound. Examples of the polyhydroxy compounds may include phloroglucine, 4,6-dimethyl-2,4,6-tri(4-hydroxyphenyl)-2-heptene, 4,6-dimethyl-2,4,6-tri(4-hydroxyphenyl)heptane, 2,6-dimethyl-2,4,6-tri(4-hydroxyphenyl)-3-heptene, 1,3,5-tri(4-hydroxyphenyl)benzene, 1,1,1-tri(4-hydroxyphenyl)ethane, 3,3-bis(4-hydroxyaryl)-oxindole (=isatin-bisphenol), 5-chloroisatin-bisphenol, 5,7-dichloroisatin-bisphenol, 5-bromoisatin-bisphenol, or the like. Among them, non-halogenated polyhydroxy compounds such as phloroglucine, 4,6-dimethyl-2,4,6-tri(4-hydroxyphenyl)-2-heptene, 4,6-dimethyl-2,4,6-tri(4-hydroxyphenyl)heptane, 2,6-dimethyl-2,4,6-tri(4-hydroxyphenyl)-3-heptene, 1,3,5-tri(4-hydroxyphenyl)benzene, 1,1,1-tri(4-hydroxyphenyl)ethane and isatin-bisphenol are preferable.

The terminator or molecular weight modifier for the above-mentioned reaction may be compounds having a monovalent phenolic hydroxyl group or compounds having an aromatic carboxyl group such as not only normal phenols such as phenol, p-t-butyl phenol or tribromophenol but also a long-chain alkylphenol, aliphatic carboxylic acid chloride, aliphatic carboxylic acid, hydroxy-benzoic acid, or the like. Among them, non-halogenated terminators or molecular weight modifiers such as phenol, p-t-butyl phenol, a long-chain alkylphenol, aliphatic carboxylic acid and hydroxy-benzoic acid are preferable, and p-t-butyl phenol is especially preferable.

In the present invention, these aromatic polycarbonate resins (A) can be used singly or in the form of a mixture of two or more. Further, the aromatic polycarbonate resin (A) is preferably non-halogenated aromatic polycarbonate resin.

The aromatic polycarbonate resin (A) has a viscosity-average molecular weight of 15,000 to 28,000 measured at 25° C. in methylene chloride. If the viscosity-average molecular weight is less than 15,000, the mechanical properties are considerably inferior. On the other hand, if the viscosity-average molecular weight is more than 28,000, the resin composition has a poor flowability upon molding. The viscosity-average molecular weight of the aromatic polycarbonate resin is preferably in the range of 16,000 to 25,000, more preferably 17,000 to 23,000.

The blending percentage of the aromatic polycarbonate resin (A) is in the range of 70 to 92% by weight based on the total weight of the glass fiber-reinforced aromatic polycarbonate resin composition. If the blending percentage of the aromatic polycarbonate resin is less than 70% by weight, it may be difficult to obtain a sufficient appearance property. On the other hand, if the blending percentage is more than 92% by weight, the mechanical properties and impact resistance may be deteriorated. The preferred blending percentage of the aromatic polycarbonate resin is in the range of 70 to 85% by weight based on the total weight of the glass fiber-reinforced aromatic polycarbonate resin composition.

The aromatic polycarbonate oligomer (B) used in the present invention can be prepared by reacting bisphenol A (BPA) with phosgene or diester of carbonic acid in the presence of an adequate molecular weight modifier. In this case, the aromatic oligomer may be a copolymer-type prepared by substituting any other divalent phenol for a part of the bisphenol. A As the other divalent phenols, the aromatic dihydroxy compounds mentioned in the above aromatic polycarbonate resin (A) may be used.

The molecular weight modifiers used in the present invention may include the compounds having a monovalent phenolic hydroxyl group or the compounds having an aromatic carboxyl such as not only normal phenols such as phenol or p-t-butyl phenol but also a long-chain alkylphenol, aliphatic carboxylic acid, hydroxy-benzoic acid, or the like. Among them, p-t-butyl phenol is especially preferable.

These aromatic polycarbonate oligomers may be used singly or in the form of a mixture of two or more. Further, aromatic polycarbonate oligomer (B) is preferably non-halogenated aromatic polycarbonate oligomer.

The preferred degree of polymerization of the aromatic polycarbonate oligomer is in the range of 2 to 15. If the degree of polymerization of such an aromatic polycarbonate oligomer is 1, a bleed-out phenomenon of the aromatic polycarbonate oligomer upon molding may occur. On the other hand, if the degree of polymerization is more than 15, it may be difficult to assure a sufficient flowability of the resin composition upon molding.

The blending percentage of the aromatic polycarbonate oligomer (B) is generally in the range of 1 to 20% by weight based on the total weight of the glass fiber-reinforced aromatic polycarbonate resin composition. If the blending percentage of the aromatic polycarbonate oligomer is less than 1% by weight, it may be difficult to obtain a sufficient flowability upon molding. On the other hand, if the blending percentage of the aromatic polycarbonate oligomer is more than 20% by weight, the mechanical properties may be inferior. Accordingly, the preferred blending percentage of the aromatic polycarbonate oligomer is in the range of 2 to 15% by weight based on the total weight of the glass fiber-reinforced aromatic polycarbonate resin composition.

The glass fiber (C) used in the present invention comprises a short glass fiber having a fiber length of not more than 140 μm and a long glass fiber having a fiber length of more than 140 μm. Further, it is required that the weight ratio of the short glass fiber to the long glass fiber is in the range from 45:55 to 85:15, and further the glass fiber (C) contains 1 to 15% by weight of a glass fiber component having a fiber length of not less than 500 μm. If the mixing percentage of the short glass fiber is less than 45% by weight based on the weight of the glass fiber (C), the impact resistance and appearance property may be inferior. On the other hand, if the blending percentage of the short glass fiber is more than 85% based on the weight of the glass fiber (C), the mechanical strength and rigidity may be considerably inferior. Furthermore, if the mixing percentage of the glass fiber component having a fiber length of not less than 500 μm is less than 1% by weight based on the weight of the glass fiber (C), the mechanical strength and rigidity may be inferior. On the other hand, if the mixing percentage of the fiber component having a fiber length of not less than 500 μm exceeds 15% by weight based on the weight of the glass fiber (C), the impact resistance and appearance property may be deteriorated. Accordingly, it is preferred that the weight ratio of the short glass fiber to the long glass fiber is in the range of not less than 50/50 and not more than 80/20, and the mixing percentage of the glass fiber component having a fiber length of not less than 500 μm is in the range of 2 to 15% by weight based on the weight of the glass fiber (C).

In addition, it is preferred that the long glass fiber has a fiber diameter of 3 to 20 μm, and the short glass fiber has a fiber diameter of 3 to 20 μm.

The blending percentage of the glass fiber is generally in the range of 3 to 20% by weight based on the total weight of the glass fiber-reinforced aromatic polycarbonate resin composition according to the present invention. If the blending percentage of the glass fiber is less than 3% by weight, it may be difficult to obtain a sufficient mechanical strength and rigidity. On the other hand, if the blending percentage of the glass fiber is more than 20% by weight, the impact resistance and appearance property may be deteriorated. Accordingly, the preferred blending percentage of the glass fiber is in the range of 5 to 15% by weight.

The long glass fiber component having a fiber length of more than 140 μm is mainly provided from glass fiber chopped strands. The chopped strands are commercially available. Examples of the commercially available chopped strands include CS03MA409C or CS03DE409C (manufactured by Asahi Fiber Glass Co., Ltd.), ECS03T511 or ECS03T511DE (manufactured by Nippon Electrical Glass Co., Ltd.), or the like. The long glass fiber having a fiber length of more than 140 μm, can be treated with a finishing agent such as a silane-based coupling agent, greige goods such as urethane-based resins or epoxy-based resins, a thermal stabilizer such as typically phosphite-based resins, or any other adequate surface-treating agents depending upon aimed uses, if required.

The short glass fiber component having a fiber length of not more than 140 μm is derived from the glass powder. For example, such a glass powder can be commercially available products such as Milled Fiber MF06JB1-20 (manufactured by Asahi Fiber Glass Co., Ltd.), and Glass Powder EPG70M-01N (manufactured by Nippon Electrical Glass Co., Ltd.), or the like. The short glass fiber having a fiber length of not more than 140 μm, can be also treated with a finishing agent such as a silane-based coupling agent, a thermal stabilizer such as phosphite-based resins, or any other adequate surface-treating agents depending upon aimed uses, if required.

The composite rubber-based graft copolymer (D) used in the resin composition according to the present invention, which is prepared by graft copolymerization with an aromatic alkenyl compound and a vinyl cyanide compound to a composite rubber comprising a polyorganosiloxane rubber component and the polyalkylacrylate rubber component or polyalkylmethacrylate rubber component. The composite rubber comprises 10 to 90% by weight of the polyorganosiloxane rubber component and 90 to 10% by weight of the polyalkylacrylate or polyalkylmethacrylate rubber component, and has a interpenetrating structure that the polyorganosiloxane rubber component and the polyalkylacrylate rubber component or polyorganosiloxane rubber component and polyalkylmethacrylate rubber component cannot be substantially separated from each other. Further, the composite rubber has an average particle size of 0.08 to 0.6 μm. The aromatic compound and the vinyl cyanide compound are grafted to the composite rubber to form the composite rubber-based graft copolymer (D).

Such a composite rubber used for the preparation of the composite rubber-based copolymer (D) is preferably prepared according to an emulsion polymerization method. In the emulsion polymerization method, first a latex of the polyorganosiloxane rubber is first prepared. Next, a monomer for the synthesis of the polyalkylacrylate or polyalkylmethacrylate rubber component is impregnated into the rubber particles of the latex. The monomer is then subjected to polymerization so as to obtain the composite rubber.

The polyorganosiloxane rubber component can be prepared by emulsion polymerization from the below-mentioned organosiloxane and a cross-linking agent (I) which uses in the preparation of polyorganosiloxane rubber component. Further the emulsion polymerization can be carried out in the presence of a grafting agent (I) which uses in the preparation of polyorganosiloxane rubber component.

Examples of the organosiloxane rubber component may include chain organosiloxanes such as dimethyl-siloxane or cyclic organosiloxanes having at least 3-membered ring, preferably 3 to 6-membered ring, such as hexamethyl-cyclotrisiloxane, octamethyl-cyclotetrasiloxane, decamethyl-cyclopentasiloxane, dodecamethyl-cyclohexasiloxane, trimethyl-triphenyl-cyclotrisiloxane, tetramethyl-tetraphenyl-cyclotetrasiloxane, octaphenyl-cyclotetrasiloxane, or the like. These organosiloxanes may be used singly or in the form of a mixture of two or more. The amount of the organosiloxane used is preferably not less than 50% by weight, more preferably not less than 70% by weight based on the total weight of the polyorganosiloxane rubber component.

As the cross-linking agent (I), a silane-based cross-linking agent having a functionality of 3 or 4 may be preferably used. Examples of the cross-linking agents are trimethoxymethyl silane, triethoxyphenyl silane, tetramethoxy silane, tetraethoxy silane, tetra-n-propoxy silane, tetrabutoxy silane, or the like. Especially, the cross-linking agent having a functionality of 4 is preferable. Among them, tetraethoxy silane is especially preferable. The cross-linking agent can be used singly or in the form of a mixture of two or more. The amount of the cross-linking agent (I) used is preferably in the range of 0.1 to 30% by weight based on the total weight of the polyorganosiloxane rubber component.

The grafting agent (I) may be compounds capable of forming structural units represented by the following formulas:

$$CH_2=C(R^2)-COO-(CH_2)_p-SiR^1_nO_{(3-n)/2} \qquad (I-1);$$

$$CH_2{=}CH{-}SiR^1{}_nO_{(3-n)/2} \quad \text{(I-2); or}$$

$$HS{-}(CH_2)_p{-}SiR^1{}_nO_{(3-n)/2} \quad \text{(I-3),}$$

where $R^1$ is a lower alkyl group such as methyl, ethyl or propyl, or a phenyl group; $R^2$ is a hydrogen atom or a methyl group; n is an integer of 0, 1 or 2; and p is an integer of 1 to 6.

Especially, acryloyl- or methacryloyl-oxy siloxane capable of forming the afore-mentioned structural unit (I–1) has a high grafting efficiency and can therefore form effective graft chains so that the resultant composite rubber-based graft copolymer can exhibit an enhanced impact resistance. The especially preferred compound capable of forming the structural unit (I–1) is methacryloyl-oxy-siloxane. Specific examples of the preferable methacryloyloxy-siloxanes may include β-methacryloyloxy-ethyldimethoxymethyl silane, γ-methacryloyloxy-propylmethoxydimethyl silane, γ-methacryloyloxy-propyldimethoxymethyl silane, γ-methacryloyloxy-propyltrimethoxy silane, γ-methacryloyloxy-propylethoxydiethyl silane, ⊖-methacryloyl-propyldiethoxymethyl silane, δ-methacryloyl-oxy-butyldiethoxymethyl silane, or the like. These methacryloyl-oxy siloxanes may be used singly or in the form of a mixture of two or more. The amount of the grafting agent used is preferably in the range of 0 to 10% by weight based on the total weight of the polyorganosiloxane rubber.

The polyorganosiloxane latex can be prepared, for example, according to the methods disclosed in U.S. Pat. Nos. 2,891,920 and 3,294,725 or the like. For example, a mixture comprising the organosiloxane, the cross-linking agent (I) and, if required, the grafting agent (I) is first prepared. The mixture is then shear-mixed with water by means of a homogenizer in the presence of a sulfonic acid-based emulsifier such as alkylbenzene sulfonic acid or alkyl sulfonic acid to produce the latex of the polyorganosiloxane. Especially, the alkylbenzene sulfonic acid is preferably used as the emulsifier because it acts also as a polymerization initiator. At this time, since the polymers as reactants can be dispersed with a high stability during the graft polymerization, metal salts of alkylbenzene sulfonic acid or alkyl sulfonic acid is preferably used together.

The polyalkylacrylate or polyalkylmethacrylate rubber component contained in the afore-mentioned composite rubber can be synthesized from alkyl acrylate or alkyl methacrylate, a cross-linking agent (II) which uses in the preparation of polyalkylacrylate or polyalkylmethacrylate rubber component and a grafting agent (II) which uses in the preparation of polyalkylacrylate or polyalkylmethacrylate rubber component, mentioned below.

Examples of the preferable alkyl acrylates or alkyl methacrylates may include methyl acrylate, ethyl acrylate, n-propyl acrylate, 2-ethylhexyl acrylate, n-butyl acrylate, hexyl methacrylate, n-lauryl methacrylate, or the like. Among them, n-butyl acrylate is especially preferred.

Examples of the preferable cross-linking agents (II) may include ethyleneglycol dimethacrylate, propyleneglycol dimethacrylate, 1,3-butyleneglycol dimethacrylate, 1,4-butyleneglycol dimethacrylate, or the like.

Examples of the preferable grafting agents (II) may include aryl methacrylate, triaryl cyanurate, triaryl isocyanurate, or the like. Incidentally, the aryl methacrylate can be also used as a cross-linking agent. These cross-linking agents (II) or the grafting agents (II) are used singly or in the form of a mixture of two or more. The total amounts of the cross-linking agents (II) and the grafting agents (II) used are in the range of 0.1 to 20% by weight based on the total weight of the polyalkyl acrylate or methacrylate rubber component.

The polymerization of the polyalkyl acrylate or polyalkyl methacrylate rubber component, can be carried out in the following manner. The afore-mentioned latex of the polyorganosiloxane rubber component is first neutralized by the addition of an aqueous alkaline solution containing sodium hydroxide, potassium hydroxide or sodium carbonate. Next, the alkyl acrylate or alkyl methacrylate, the cross-linking agents and the grafting agents are added to the latex mixture and impregnated into the rubber particles of the polyorganosiloxane rubber component. Thereafter, the polymerization is carried out in the presence of an ordinary radical polymerization initiator. As the polymerization proceeds, the polyorganosiloxane rubber component and the polyalkyl acrylate or polyalkyl methacrylate rubber component are interpenetrated together to form a cross-linked network structure so that both the components are unseparable, whereby a latex of the composite rubber comprising the polyorganosiloxane rubber component and the polyalkyl acrylate or polyalkyl methacrylate rubber component can be obtained. The preferred composite rubber of the composite rubber-based graft copolymer according to the present invention, may contain the polyorganosiloxane rubber component having a main skeleton comprising repeating units of dimethyl siloxane, and the polyalkyl acrylate or polyalkyl methacrylate rubber component having a main skeleton comprising repeating units of n-butyl acrylate.

The composite rubber thus obtained has preferably a gel content of not less than 80% by weight when measured by extracting a soluble component therefrom in toluene at 90° C. for 12 hours.

In order to obtain a molded product having excellent impact resistance and appearance property in a well-balanced manner, the blending percentages of the polyorganosiloxane rubber component and the polyalkyl acrylate or polyalkyl methacrylate rubber component are preferably in the ranges of 10 to 90% by weight and 90 to 10% by weight, respectively. Further, the average particle size of the composite rubber is preferably in the range of 0.08 to 0.6 $\mu$m.

The vinyl-based monomers capable of being grafted to the composite rubber may comprise, for example, aromatic alkenyl compounds such as styrene, α-methyl styrene or vinyl toluene, and vinyl cyanide compounds such as acrylonitrile or methacrylonitrile. In addition, a small amount of methacrylates such as methyl methacrylate or 2-ethylhexyl methacrylate, or acrylates such as methyl acrylate, ethyl acrylate or butyl acrylate may be contained in the vinyl-based monomer. It is preferred that the styrene monomer and the acrylonitrile monomer are used in combination. It is preferred that the total content of the aromatic alkenyl compound and the vinyl cyanide compound is preferably in the range of 30 to 95% by weight based on the total weight of the glass fiber-reinforced aromatic polycarbonate resin composition, and the content of the composite rubber is in the range of 5 to 70% by weight based on the total weight of the glass fiber-reinforced aromatic polycarbonate resin composition. The weight ratio of the aromatic alkenyl compound to the vinyl cyanide compound is preferably in the range from 5:95 to 95:5.

The composite rubber-based graft copolymer can be obtained in the following manner. The afore-mentioned vinyl-based monomers are mixed with the composite rubber latex and polymerized in single or multiple stages according to a radical polymerization method to prepare a latex of the composite rubber-based graft copolymer. The thus-prepared latex of the composite rubber-based graft copolymer is then poured into hot water dissolving a metal salt such as calcium chloride, magnesium sulfate or the like to salt-out a solid product. The solid product is then separated from the reaction mixture to recover the composite rubber-based graft copolymer.

Such composite rubber-based graft copolymers are commercially available. One example of the commercially available graft copolymers is METABLENE RK-200 (manufactured by Mitsubishi Rayon Co., Ltd.).

The blending percentage of the thus-obtained composite rubber-based graft copolymer (D) is in the range of 0.5 to 15% by weight, preferably 1 to 10% by weight based on the total weight of the aromatic polycarbonate resin composition according to the present invention. If the blending percentage of the composite rubber-based graft copolymer is less than 0.5% by weight, the appearance property and impact resistance may be insufficient. On the other hand, if the blending percentage of the composite rubber-based graft copolymer is more than 15% by weight, the flow marks or silver surfaces may be occur, the color-shade when colored with a dye or pigment may be occur, or the mechanical properties may be deteriorated.

The halogen content of the resin composition of the present invention is not more than 0.5% by weight, preferably not more than 0.3% by weight, more preferably not more than 0.1% by weight based on the total weight of the resin composition. Especially, it is most preferably that the resin composition of the present invention contains substantially no halogen. The resin composition which contains substantially no halogen can be obtained by use of non-halogenated aromatic polycarbonate resin and non-halogenated aromatic polycarbonate oligomer as components (A) and (B), respectively.

When the halogen content of the resin composition of the present invention is more than 0.5% by weight based on total amount of the said resin composition, the Izod impact strength is deteriorated, and the appearance property is inferior because of the deterioration of heat stability due to the containing halogen at the high temperature in which the molding into a thin molded product can be conducted.

In the present invention, the heat stability of the resin composition is evaluated by the reduction percentage of molecular weight of polycarbonate during the molding process at high temperature for long residence time. The detail evaluation method is described in Examples. When heat stability is not sufficient, the appearance property of the product molded at high temperature is deteriorated and the Izod impact strength is reduced. Incidentally, in the present invention, it is required that a notched specimen made from the resin composition has an Izod impact strength of not less than 6 kgf cm/cm while an unnotched specimen made from the resin composition has an Izod impact strength of not less than 180 kgf·cm/cm. The Izod impact strength is measured by the method: notched and unnotched specimens each having a thickness of 3.2 mm were subjected to an Izod impact test according to ASTM-D256.

In the molding to a thin molded product, it is required that the molding is generally conducted at high temperature and the residence time of the resin composition in a cylinder of molding machine is long. Therefore, the resin composition of the present invention having excellent heat stability is suitable for conducting thin-molding.

As described above, when the aromatic polycarbonate oligomer (B), the glass fiber having an optimum distribution of its fiber length (C), and the composite rubber-based graft copolymer (D), which is prepared by grafting the styrene monomer and the acrylonitrile monomer to the composite rubber containing the polyorganosiloxane rubber component and the polyalkyl acrylate or the polyalkyl methacrylate component and having such a network structure that both the components are interpenetrated and unseparable each other, are mixed to the aromatic polycarbonate resin (A), at particular proportions, the resultant glass fiber-reinforced aromatic polycarbonate resin composition with not more than 0.5% by weight of halogen content can be molded into a thin product having a thickness of about 0.5 to about 5 mm. The resin composition exhibits a superior flowability upon molding of the thin product, and the resultant molded product is superior and well-balanced in appearance, and mechanical properties such as impact resistance, mechanical strength and rigidity.

The resin composition according to the present invention may further include optional additives such as a mold release agent, antistatic agent, a light-stabilizer, an antioxidant, a foaming agent, a dye or a pigment, a reinforcing agent, an inorganic filler or other synthetic resins, if required, unless the addition of these additives adversely affects the properties thereof. The blending percentages of the additives of the mold release agent, antistatic agent, light-stabilizer, antioxidant, foaming agent, dye or pigment are in the range of not more than 5% by weight, preferably not more than 3% by weight based on the total weight of the resin composition. The blending percentages of the additives of the reinforcing agent, inorganic filler or other synthetic resins are in the range of not more than 30% by weight, preferably not more than 20% by weight based on the total weight of the resin composition.

Examples of the mold release agents may include pentaerythritol-tetrastearate, pentaerythritol-tetrapelargonate, stearyl stearate, behenyl behenate, stearyl-mono, di- or triglyceride, sorbitan-monostearate, paraffin wax, beeswax, polydimethyl siloxane, phenyl-containing dimethyl siloxane, or the like.

Examples of the antistatic agents may include glycerol-monostearate, dodecylbenzene-sulfonic acid ammonium salt, dodecylbenzene-sulfonic acid phosphonium salt, maleic anhydride-mono- or di-glyceride, graphite, a metal powder, or the like.

Examples of the light-stabilizers may include 2-(2-hydroxy-5-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis($\alpha,\alpha$-dimethylbenzyl)phenyl]-2H-benzotriazole, 2,2'-methylene-bis(4-cumyl-6-benzotriazolephenyl), 2,2'-p-phenylene-bis(3,1-benzoxazine-4-on), polyalkylene naphthalate, or the like.

Examples of the antioxidants may include phosphoric acid, phosphate such as trimethyl phosphate, phosphorous acid, phosphite such as tris(2,4-di-tert-butylphenyl) phosphite, pentaerythritol-tetrakis(3-mercapto-propionate), pentaerythritol-tetrakis(3-laurylthio-propionate), glycerol-3-stearylthio-propionate, octadecyl-3-(3,5-di-tert-butyl-4-hydroxyphenyl)propionate, tetrakis(2,4-di-tert-butylphenyl) -4,4'-biphenylene phosphonate, or the like.

Examples of the reinforcing agents may include a metal fiber, a silicon nitride fiber, potassium titanate whiskers, a boron fiber, a whole aromatic polyamide fiber, a whole aromatic polyester fiber, a carbon fiber, glass beads, glass flakes, titanium oxide, alumina, silica, talc, clay, mica, quartz powder, or the like.

Examples of the other synthetic resins, which can be added to the resin composition according to the present invention, include polyethylene, polyethylene-terephthalate (PET), polybutylene-terephthalate (PBT), polystyrene, an acrylonitrile-styrene (AS) resin, an acrylonitrile-butadiene-styrene (ABS) resin, or the like.

The resin composition according to the present invention can be prepared by using any of normal methods without limitation. For example, the preparation of the resin composition can be performed by a method in which the respective components (A), (B), (C) and (D) and adequate additives are preliminarily charged into a V-type blender or a super mixer and intimately mixed together and then the mixture is melted and kneaded in a vented single-screw or twin-screw extruder and extruded into pellets; a method in which the components (A), (B) and (D) and the adequate additives except the component (C) are preliminarily charged into the V-type blender or a super mixer and intimately mixed together and then the mixture is melted and kneaded in a vented single-screw or twin-screw extruder and mixed with the component (C) supplied in the course of the extrusion process to obtain pellets; or a method in which the components (A), (B) and (D), only the short fiber of the component (C) and the adequate additives are preliminarily charged into the V-type blender or a super mixer and intimately mixed together and then the mixture is melted and kneaded in a vented single-screw or twin-screw extruder and mixed with the long fiber of the component (C) supplied in the course of the extrusion process to obtain pellets.

In the case where the molding material comprising the resin composition according to the present invention is prepared by using any of the afore-mentioned methods, the glass fiber of the resin composition is pulverized during the preparation, so that the blending percentage of the short fiber in the resin composition is increased. Accordingly, in order to obtain an optimum distribution of the glass fiber, an adequate raw glass fiber is to be selected in view of a possible increase in blending percentage of the short fiber. Normally, a weight ratio of the glass fiber chopped strands to the glass powder should be adequately selected. In addition, a molding material having the optimum distribution of the glass fiber can be obtained by variously changing a revolution number of an extruder screw, a cylinder temperature or a shape of the extruder screw upon the pelletization of the resin composition.

The thin molded product prepared from the glass fiber-reinforced aromatic polycarbonate resin composition according to the present invention, can exhibit excellent moldability, appearance property, bending modulus and impact resistance in a well-balanced condition. Accordingly, the resin composition according to the present invention is useful as a material for a housing or a cover of devices in mechanical, electrical, electronic and office-automation fields, especially those for potable terminal equipment such as portable telephones or electronic pocketbook.

EXAMPLES

The present invention is described in more detail by way of examples. However, the examples are only illustrative and therefore the present invention is not limited to these examples.

Incidentally, "part" appearing through all the examples is on a weight basis, unless otherwise specified.

The raw materials used in the respective examples were as follows.

(a) Aromatic polycarbonate resin: Iupiron S-3000 manufactured by Mitsubishi Engineering Plastic Co., Ltd. which is a powdery aromatic polycarbonate resin having a viscosity-average molecular weight of 22,000 and prepared from bisphenol A, p-tert-butylphenol (as a molecular weight modifier) and phosgene by using a normal method (hereinafter referred to merely as "PC").

(b) Non-halogenated aromatic polycarbonate oligomer: Iupiron AL071 manufactured by Mitsubishi Engineering Plastic Co., Ltd. which is a powdery aromatic polycarbonate oligomer having an average degree of polymerization of 7 and prepared from bisphenol A and phosgene by using a normal method (hereinafter referred to merely as "PC oligomer-1").

(c) Halogenated aromatic polycarbonate oligomer: Iupiron FR-53 manufactured by Mitsubishi Engineering Plastic Co., Ltd. which is a powdery aromatic polycarbonate oligomer having a bromine-content of 58.8 wt %, having a viscosity-average molecular weight of 7300 and prepared from tetrabromobisphenol A and phosgene with 2,4,6-tribromophenol as a terminator by using a normal method (hereinafter referred to merely as "PC oligomer-2").

(d) Glass fiber (long glass fiber): Chopped Strand CS03MA409C manufactured by Asahi Fiber Glass Co., Ltd. and having an average fiber length of about 3 $\mu$m (hereinafter referred to merely as "L-GF").

(e) Glass fiber (short glass fiber): Glass Powder EPG70M-O1N manufactured by Nippon Electric Glass Co., Ltd. and having an average fiber length of about 70 pm (hereinafter referred to merely as "S-GF").

(f) Composite rubber-based graft copolymer: METABLENE RK-200 manufactured by Mitsubishi Rayon Co., Ltd. (hereinafter referred to merely "composite rubber 1")

(g) Composite rubber-based graft copolymer: METABLENE S-2001 manufactured by Mitsubishi Rayon Co., Ltd. (hereinafter referred to merely "composite rubber 2")

Items to be evaluated in the examples were as follows.

(1) Halogen content: Specimens were subject to an ashing treatment and the generated combustion gas during the treatment was collected. The halogen content of the collected gas was determined by ion-chromatography.

(2) Impact strength: Notched and unnotched specimens each having a thickness of 3.2 mm were subjected to an Izod impact test according to ASTM-D256. Incidentally, it is required that a notched specimen according to the present invention has an Izod impact strength of not less than 6 kgf·cm/cm while an unnotched specimen according to the present invention has an Izod impact strength of not less than 180 kgf·cm/cm.

(3) Bending modulus: Specimens were subjected to a bending test according to ASTM-D790. Incidentally, it is required that a specimen according to the present invention has a bending modulus of 27000 kgf/cm$^2$.

(4) Fiber length and distribution thereof: A specimen for Izod impact test was allowed to stand in an electric furnace at 650° C. for 2 hours. The glass fiber left as an ash content was measured by using an image analyzer (Image Processing R & D System TOSPIX-i produced by Toshiba Corp.). Incidentally, in accordance with the present invention, it is required that a weight ratio of the short glass fiber having a fiber length of not more than 140 $\mu$m to the long glass fiber having a fiber length of not more than 140 $\mu$m is not less than 45/55 and not more than 85/15, and the glass fiber contains a glass fiber component having a fiber length of more than 500 $\mu$m, of 1 to 15% by weight based on the weight of the glass fiber (C).

(5) Appearance property: A disc-like specimen injection-molded through a side gate and having a diameter of 100 mm and a thickness of 3.2 mm, was visually observed. Upon the visual observation, a surface smoothness, flow marks in proximity of the side gate and an entire color shade were checked. Evaluations by the visual observation were defined as follows.

A: Good surface smoothness, no flow mark in proximity of the side gate and no entire color shade;

B: At least one deficiency of unevenness of the surface, the flow mark in proximity of the side gate and the entire color shade, was recognized.

C: All the deficiencies of unevenness of the surface, the flow mark in proximity of the side gate and the entire color shade were recognized.

In accordance with the present invention, a specimen is required to satisfy the evaluation A.

Accordingly, it is necessary that the glass fiber-reinforced aromatic polycarbonate resin composition according to the present invention satisfies all the requirements (1) to (4).

(6) Heat stability: Two kind molded products are prepared under two different molding conditions (molding condition 1 and molding condition 2). The residence time of the resin composition in the cylinder of molding machine in the molding condition 2 was longer than that in the molding condition 1. Further, the molding temperature in the molding condition 2 was higher than that in the molding condition 1. Namely, the molding condition of the molding condition 2 was severer than that of the molding condition 1. Each specimen for Izod test prepared under the above two condition was dissolved in methylene chloride. The obtained solution was filtered and methylene chloride was removed to obtain polycarbonate. The viscosity-average molecular weight of the obtained polycarbonate was measured at 25° C. in methylene chloride. The viscosity-average molecular weight of the obtained polycarbonate from the specimen prepared under the molding condition 1 (molecular weight-1) was compared with that under the molding condition 2 (molecular weight-2). When the reduction percentage of molecular weight-2 to the molecular weight-1 is within 5%, the specimen has sufficient heat stability.

Examples 1 to 5 and Comparative Examples 1 to 6:

An aromatic polycarbonate resin (PC), an aromatic polycarbonate oligomer (PC oligomer-1), a halogenated aromatic polycarbonate oligomer (PC oligomer-2), glass fibers (L-GF and S-GF), a composite rubber-based graft copolymer (composite rubber 1 and composite rubber 2) and carbon black were intimately mixed in a tumbler at mixing ratios listed in Table 1 for about 10 minutes. The mixture was fed into a vented single-screw extruder having an orifice diameter of 40 mm and extruded into pellets at a temperature of 260° to 280° C. The thus prepared pellets were dried at 120° C. for 6 hours in a hot air drier. The dried pellets were fed to an injection molding machine (IS150EN manufactured by Toshiba Machinery Co., Ltd.) and molded into the afore-mentioned specimens under the following two molding conditions. Molding condition 1: Cylinder temperature was 280° to 300° C. Die temperature was 110° C. Molding cycle time was 60 seconds. Molding condition 2: Cylinder temperature was 300° to 320° C. Die temperature was 110° C. Molding cycle time was 180 seconds.

The results are shown in Tables 1 and 2.

TABLE 1

| | | Example 1 | Example 2 | Example 3 |
|---|---|---|---|---|
| Ingredients (wt %) | | | | |
| PC | | 82.9 | 79.9 | 82.9 |
| PC oligomer-1 | | 5 | 5 | 5 |
| PC oligomer-2 | | — | — | — |
| Glass fiber | | | | |
| S-GF | | 8 | 8 | 7 |
| L-GF | | 2 | 2 | 3 |
| Composite rubber 1 | | 2 | 5 | 2 |
| Composite rubber 2 | | — | — | — |
| Carbon black | | 0.1 | 0.1 | 0.1 |
| Distribution of glass fiber (wt %) | | | | |
| 140 μm ≧ | | 72.7 | 71.1 | 57.8 |
| 140–500 μm | | 23.7 | 24.7 | 31.0 |
| 500 μm < | | 3.6 | 4.2 | 11.2 |
| Halogen content (wt %) | | 0.01> | 0.01> | 0.01> |
| Molding condition 1 | Bending modulus (Kgf · cm²) | 29700 | 29300 | 31500 |
| | Izod Impact strength (Kgf · cm/cm) | | | |
| | notched specimen | 11 | 12 | 7 |
| | unnotched specimen | 221 | 253 | 195 |
| | Appearance property (100 mm × 3.2 mm, disc) | A | A | A |
| | Molecular weight of PC in the test piece for Izod measurement | 21400 | 21300 | 21600 |
| Molding condition 2 | Izod Impact strength (Kgf · cm/cm) | | | |
| | notched specimen | 10 | 11 | 7 |
| | unnotched specimen | 199 | 221 | 178 |
| | Appearance property (100 × 3.2 mm, disc) | A | A | A |
| | Molecular weight of PC in the test piece for Izod measurement | 21100 | 21100 | 21200 |

| | | Example 4 | Example 5 |
|---|---|---|---|
| Ingredients (wt %) | | | |
| PC | | 79.9 | 74.9 |
| PC oligomer-1 | | 5 | 10 |
| PC oligomer-2 | | — | — |
| Glass fiber | | | |
| S-GF | | 7 | 8 |
| L-GF | | 3 | 2 |
| Composite rubber 1 | | 5 | 5 |
| Composite rubber 2 | | — | — |
| Carbon black | | 0.1 | 0.1 |
| Distribution of glass fiber (wt %) | | | |
| 140 μm ≧ | | 56.9 | 69.2 |
| 140–500 μm | | 30.5 | 25.4 |
| 500 μm < | | 12.6 | 5.4 |
| Halogen content (wt %) | | 0.01> | 0.01> |
| Molding condition 1 | Bending modulus (Kgf · cm²) | 30900 | 29400 |
| | Izod Impact strength (Kgf · cm/cm) | | |
| | notched specimen | 8 | 10 |
| | unnotched specimen | 202 | 234 |
| | Appearance property (100 mm × 3.2 mm, disc) | A | A |
| | Molecular weight of PC in the test piece for Izod measurement | 21500 | 21200 |
| Molding condition 2 | Izod Impact strength (Kgf · cm/cm) | | |
| | notched specimen | 7 | 9 |
| | unnotched specimen | 183 | 214 |
| | Appearance property (100 × 3.2 mm, disc) | A | A |

TABLE 1-continued

|  |  |  |
|---|---|---|
| Molecular weight of PC in the test piece for Izod measurement | 21200 | 21000 |

TABLE 2

|  | Comp. Example 1 | Comp. Example 2 | Comp. Example 3 |
|---|---|---|---|
| Ingredients (wt %) | | | |
| PC | 84.9 | 79.9 | 79.9 |
| PC oligomer-1 | 5 | 5 | 5 |
| PC oligomer-2 | — | — | — |
| Glass fiber | | | |
| S-GF | 8 | 10 | — |
| L-GF | 2 | — | 10 |
| Composite rubber 1 | — | 2 | 2 |
| Composite rubber 2 | — | — | — |
| Carbon black | 0.1 | 0.1 | 0.1 |
| Distribution of glass fiber (wt %) | | | |
| 140 μm ≧ | 73.6 | 87.5 | 17.1 |
| 140–500 μm | 23.2 | 12.5 | 62.3 |
| 500 μm < | 3.2 | — | 20.6 |
| Halogen content (wt %) | 0.01> | 0.01> | 0.01> |
| Molding condition 1 Bending modulus (Kgf · cm²) | 31700 | 25400 | 35600 |
| Izod Impact strength (Kgf · cm/cm) | | | |
| notched specimen | 5 | 12 | 8 |
| unnotched specimen | 110 | 328 | 105 |
| Appearance property (100 mm × 3.2 mm, disc) | B | A | B |
| Molecular weight of PC in the test piece for Izod measurement | 21500 | 21400 | 21400 |
| Molding condition 2 Izod Impact strength (Kgf · cm/cm) | | | |
| notched specimen | 5 | 10 | 8 |
| unnotched specimen | 87 | 258 | 82 |
| Appearance property (100 × 3.2 mm, disc) | B | A | B |
| Molecular weight of PC in the test piece for Izod measurement | 21300 | 21200 | 21100 |

|  | Comp. Example 4 | Comp. Example 5 | Comp. Example 6 |
|---|---|---|---|
| Ingredients (wt %) | | | |
| PC | 87.9 | 74.9 | 74.9 |
| PC oligomer-1 | — | 10 | — |
| PC oligomer-2 | — | — | 10 |
| Glass fiber | | | |
| S-GF | 8 | 8 | 8 |
| L-GF | 2 | 2 | 2 |
| Composite rubber 1 | 2 | — | 5 |
| Composite rubber 2 | — | 5 | — |
| Carbon black | 0.1 | 0.1 | 0.1 |
| Distribution of glass fiber (wt %) | | | |
| 140 μm ≧ | 74.2 | 70.1 | 69.0 |
| 140–500 μm | 22.3 | 24.3 | 24.5 |
| 500 μm < | 3.5 | 5.6 | 6.5 |
| Halogen content (wt %) | 0.01> | 0.01> | 5.9 |
| Molding condition 1 Bending modulus (Kgf · cm²) | 28900 | 29400 | 29300 |
| Izod Impact strength (Kgf · cm/cm) | | | |
| notched specimen | 12 | 9 | 7 |
| unnotched specimen | 231 | 228 | 98 |
| Appearance property (100 mm × 3.2 mm, disc) | C | C | B |
| Molecular weight of PC in the test piece for Izod measurement | 21600 | 21100 | 21000 |
| Molding condition 2 Izod Impact strength (Kgf · cm/cm) | | | |
| notched specimen | 11 | 8 | 3 |
| unnotched specimen | 209 | 199 | 57 |
| Appearance property (100 × 3.2 mm, disc) | C | C | C |
| Molecular weight of PC in the test piece for Izod measurement | 21200 | 20800 | 16900 |

What is claimed is:

1. A glass fiber-reinforced polycarbonate resin composition comprising:

(A) 70 to 92% by weight of an aromatic polycarbonate resin;

(B) 1 to 20% by weight of an aromatic polycarbonate oligomer;

(C) 3 to 20% by weight of a glass fiber comprising a short glass fiber having a fiber length of not more than 140 μM and a long glass fiber having a fiber length of more than 140 μm.

a weight ratio of said short glass fiber to said long glass fiber being from 45:55 to 85:15 and the amount of a glass fiber component having a fiber length of more than 500 μm being 1 to 15% by weight based on the total weight of said glass fiber; and (D) 0.5 to 15% by weight of a composite rubber-based graft copolymer comprising a composite rubber comprising a polyorganosiloxane rubber component and a polyalkylacrylate rubber component or polyalkylmethacrylate rubber component, and graft component formed from an aromatic alkenyl compound and a vinyl cyanide compound, which graft component is grafted to said composite rubber, halogen content in said resin composition being not more than 0.5% by weight based on total weight of said resin composition.

2. The glass fiber-reinforced polycarbonate resin composition according to claim 1, comprising:

(A) 70 to 85% by weight of said aromatic polycarbonate resin;

(B) 2 to 15% by weight of said aromatic polycarbonate oligomer;

(C) 5 to 15% by weight of said glass fiber; and (D) 1 to 10% by weight of said composite rubber-based graft copolymer.

3. The glass fiber-reinforced polycarbonate resin composition according to claim 1, wherein said aromatic polycarbonate resin (A) has a viscosity-average molecular weight measured at 25° C. in methylene chloride of 15,000 to 28,000.

4. The glass fiber-reinforced polycarbonate resin composition according to claim 1, wherein said aromatic polycarbonate oligomer (B) has an average degree of polymerization of 2 to 15.

5. The glass fiber-reinforced polycarbonate resin composition according to claim 1, wherein said composite rubber has an interpenetrating structure in which said polyorganosiloxane rubber component and said polyalkylacrylate or polyalkylmethacrylate rubber component are unseparable from each other.

6. The glass fiber-reinforced polycarbonate resin composition according to claim 1, wherein said aromatic alkenyl compound is a styrene monomer and said vinyl cyanide compound is an acrylonitrile monomer.

7. The glass fiber-reinforced polycarbonate resin composition according to claim 1, wherein the weight ratio of said short glass fiber to said long glass fiber is from 50:50 to 80:20, and the amount of the fiber glass component having a fiber length of more than 500 $\mu$m is 2 to 15% by weight based on the total weight of said glass fiber.

8. The glass fiber-reinforced polycarbonate resin composition according to claim 1, wherein the halogen content of resin composition is not more than 0.3% by weight based on total weight of said resin composition.

9. The glass fiber-reinforced polycarbonate resin composition according to claim 1, wherein the halogen content of resin composition is not more than 0.1% by weight based on total weight of said resin composition.

10. The glass fiber-reinforced polycarbonate resin composition according to claim 1, wherein said resin composition contains no halogen.

11. A glass fiber-reinforced polycarbonate resin composition comprising:

(A) 70 to 92% by weight of a non-halogenated aromatic polycarbonate resin;

(B) 1 to 20% by weight of a non-halogenated aromatic polycarbonate oligomer;

(C) 3 to 20% by weight of a glass fiber comprising a short glass fiber having a fiber length of not more than 140 $\mu$m and a long glass fiber having a fiber length of more than 140 $\mu$M, a weight ratio of said short glass fiber to said long glass fiber being from 45:55 to 85:15 and the amount of a glass fiber component having a fiber length of more than 500 $\mu$m being 1 to 15% by weight based on the total weight of said glass fiber; and (D) 0.5 to 15% by weight of a composite rubber-based graft copolymer comprising a composite rubber comprising a polyorganosiloxane rubber component and a polyalkylacrylate rubber component or polyalkylmethacrylate rubber component, and graft component formed from an aromatic alkenyl compound and a vinyl cyanide compound, which graft component is grafted to said composite rubber.

12. The glass fiber-reinforced polycarbonate resin composition according to claim 11, comprising:

(A) 70 to 85% by weight of said non-halogenated aromatic polycarbonate resin;

(B) 2 to 15% by weight of said non-halogenated aromatic polycarbonate oligomer;

(C) 5 to 15% by weight of said glass fiber; and (D) 1 to 10% by weight of said composite rubber-based graft copolymer.

13. The glass fiber-reinforced polycarbonate resin composition according to claim 11, wherein said non-halogenated aromatic polycarbonate resin (A) has a viscosity-average molecular weight measured at 25° C. in methylene chloride of 15,000 to 28,000.

14. The glass fiber-reinforced polycarbonate resin composition according to claim 11, wherein said non-halogenated aromatic polycarbonate oligomer (B) has an average degree of polymerization of 2 to 15.

* * * * *